July 2, 1968     A. WEHNER     3,390,771

OSCILLATING SCREEN FRAME

Filed Sept. 16, 1965     6 Sheets-Sheet 1

INVENTOR
ALBERT WEHNER
BY
Fraser & Fraser
ATTORNEYS

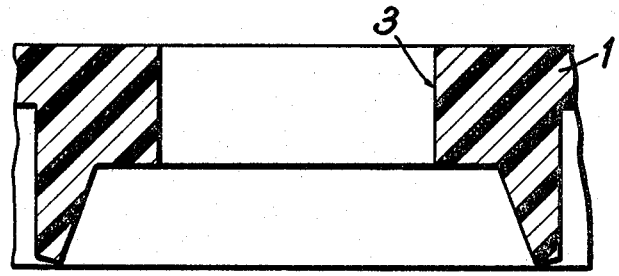
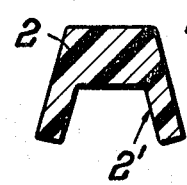
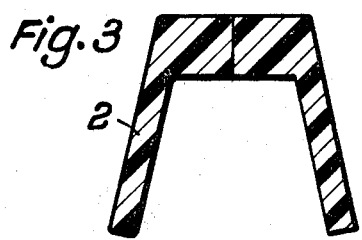
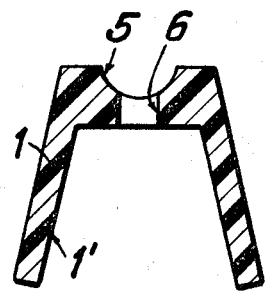

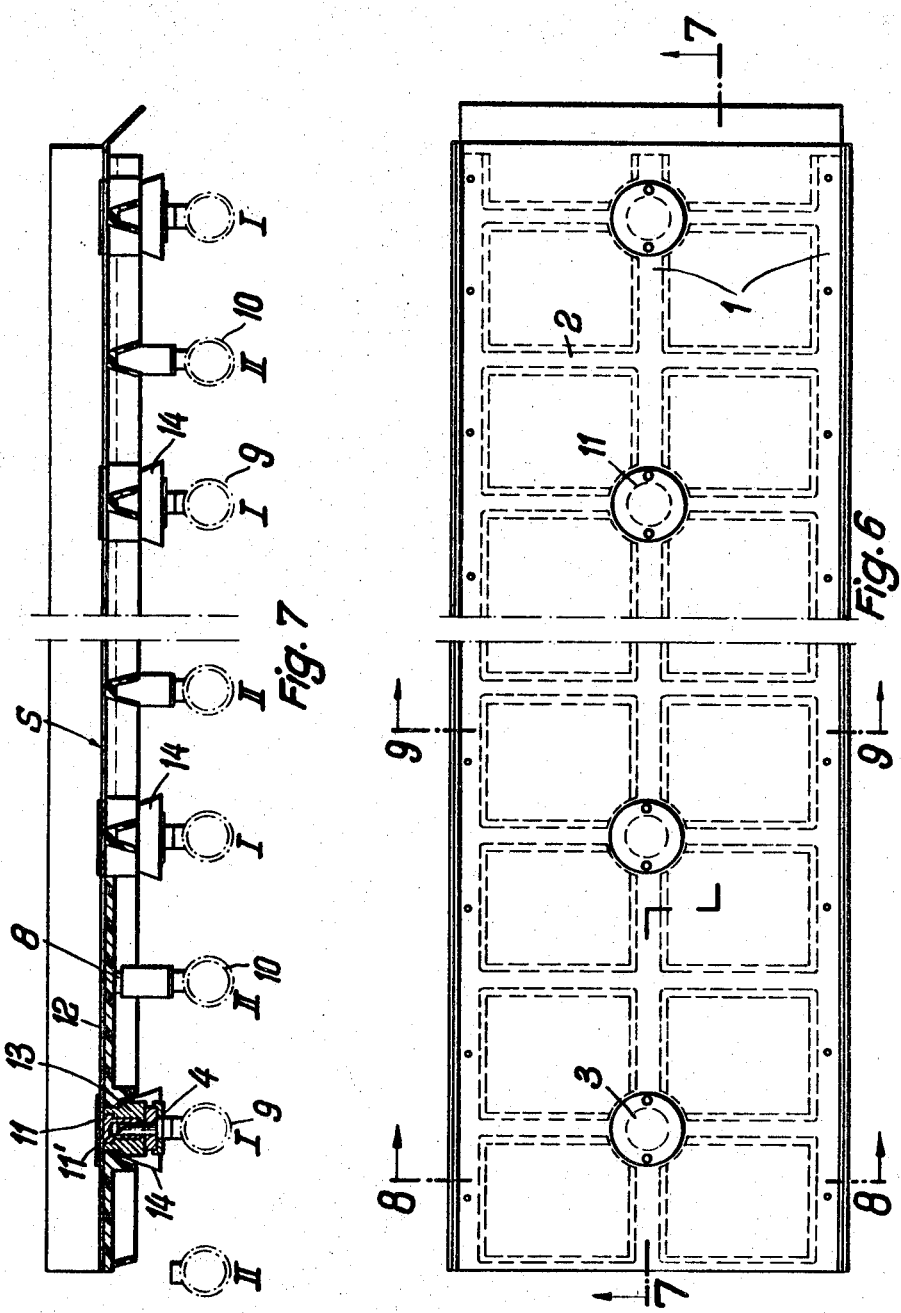

INVENTOR.
ALBERT WEHNER

United States Patent Office 3,390,771
Patented July 2, 1968

3,390,771
OSCILLATING SCREEN FRAME
Albert Wehner, Weberstrasse 31,
Monheim (Rhine), Germany
Filed Sept. 16, 1965, Ser. No. 487,815
Claims priority, application Germany, Oct. 21, 1964,
W 37,802
2 Claims. (Cl. 209—365)

ABSTRACT OF THE DISCLOSURE

A screen having an elastic screen frame provided with longitudinal and transverse members of inverted U-form in cross section, there being a row of holes at the intersection of certain of these members from which depend cup-shaped bushings which are secured in position. Impulsing pins have limited vertical movement in the bushings respectively and bearer members carrying such pins have oscillatory movement. A row of supporting pins alternate with individual impulsing pins and each supporting pin projects into the grooves formed by the inverted U-form of the screen frame. Bearer members for the supporting pins respectively may be stationary or have oscillatory movement 180° out of phase with respect to the bearer members for the impulsing pins.

---

This invention relates to apparatus for screening very fine, difficult screenable materials, particularly materials which cause considerable wear, and which cannot therefore be screened by the usual screening devices.

I have proposed a screen comprising a screening surface directly or indirectly supported by substantially parallel bearer members arranged in side by side relationship and combined alternately in two groups at least one of which is movable with respect to the other, the movement of the group or groups being such that each bearer member thereof moves in a closed circular path lying in the plane of the bearer member, said screening surface being exposed to elastic or inelastic impacts by the moving bearer members, in which the screening surface, or an intermediate frame supporting the same, is provided with coupling means which are slidably engageable by cooperating entraining members provided in one movable group of the bearer members in such manner that the screening surface is forced to participate in the circular path of movement of the entraining members, except during certain phases of the motion of the entraining members when the screening surface is under the influence of the bearer members of the other group and moves relative to the entraining members in a direction substantially at right angles to the screening surface.

In one embodiment of the screen referred to above, the coupling means are in the form of cycles or bores in the screening surface and the entraining members are in the form of pins which slidably project into said eyelets or bores.

The two groups of bearer members may perform co-directional relatively phase-displaced oscillatory motions or contra-directional oscillatory motions. Alternatively, only one of the groups of bearer members may be made to oscillate, whereas the other remains stationary. Owing to the screening surface, of said intermediate frame, bearing down alternately on the bearer members of one group and then on the bearer members of the other group, an abruptly reversing arcuate oscillation is performed by the screening surface proper, for instance in the form of semi-circular or half-moon shaped oscillations. Apart from these advantageous kinematics, the further advantage is secured that only the mass of the screening surface, and the intermediate frame when this is provided, is subjected to high accelerations. The oscillatory motion of the screening surface generated by the reversing and transferring action of the bearer member groups permits surprising screening effects and a high specific screening performance within a small space to be achieved, and it is thus possible successfully to screen materials that are otherwise most difficult to screen including materials of a sticky nature.

The object of the present invention is to improve the screen of the above character both with respect to its construction and nature and with respect to the kinematic connection between the screening surface and the motion generating entraining members.

In one aspect of the present invention, a screen comprises an intermediate frame supporting the screening surface and provided with bores which slidably receive entraining members in the form of impulsing pins secured to the bearer member of one group. The impulsing pins are located under a cover below the upper surface of said frame and the latter comprises longitudinal and/or transverse members of substantially channel section with their open sides facing downwards, the bearer members of the other group being provided with supporting pins which longitudinally slidably engage the downwardly facing grooves thus formed in the longitudinal and/or transverse members. Preferably the screen frame consists of an elastically resilient material, particularly of cast, injection, molded or welded plastics, known in the trade as "Vulkollan," "Supralen" or an expanded polyester urethane being particularly suitable. A screen frame of such a kind is of relatively light weight and it excels more particularly by the ease with which it can be mounted on the pins and bearer members of the two groups and by the fact that the movable connections with the impulsing and supporting pins are properly covered and thus protected from contamination by the screened material and by dirt. Since such a screen frame has a smooth surface, it is subject to relatively little wear. At the same time the screening and conveying action is not interfered with. Furthermore, the flat surface of the frame permits screening cloths and meshes of all kinds to be conveniently affixed thereto. These may be attached to the screen frame either in the form of a continuous screening surface or, as may occasionally be advantageous, in the form of separate panels insertable into the windows formed by the crossing frame sections. Finally, owing to its circumferentially smooth contour, and since the means of connection to the impulsing and supporting pins of the two bearer member groups are located exclusively on the underside of the screen frame, the latter is particularly well adapted for the construction of large and extended screens by the combination of satndard component frames on the modular construction principle.

The invention will now be described in greater detail, by way of example, with reference to the accompanying drawings, in which FIGURE 1 is a plan of a screen in accordance with the invention;

FIGURES 2 to 5 are sections taken on the lines A-B, C-D, E-F and G-H, respectively, of FIGURE 1;

FIGURE 6 is a plan of the frame of the screen mounted on the impulsing and supporting pins;

FIGURE 7 is a section taken on the line 7—7 of FIGURE 6;

Figure 1:
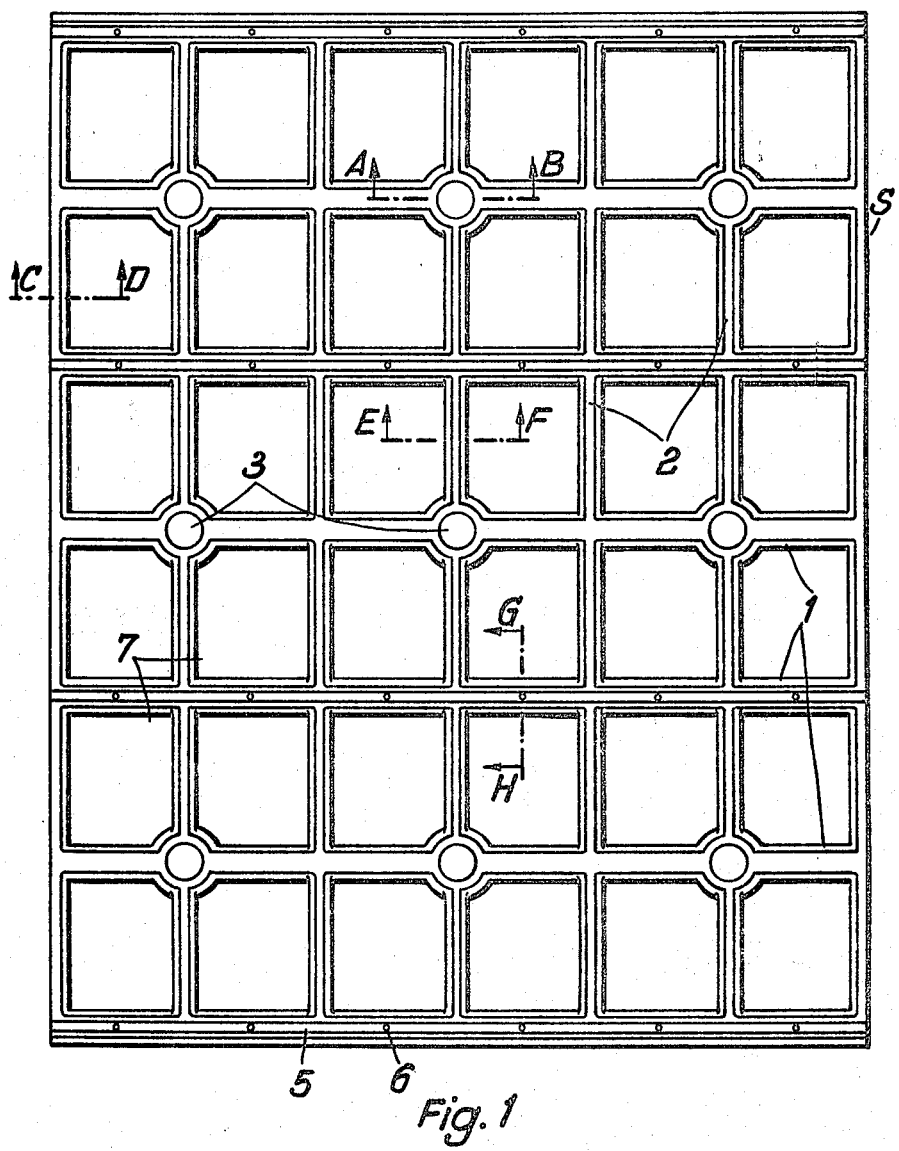
Figure 8:
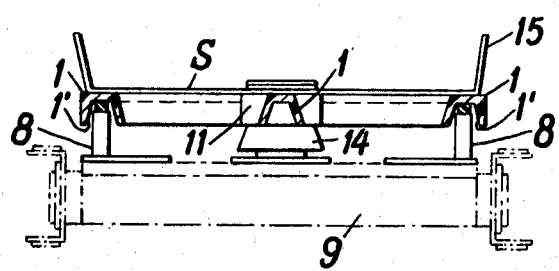
Figure 9:
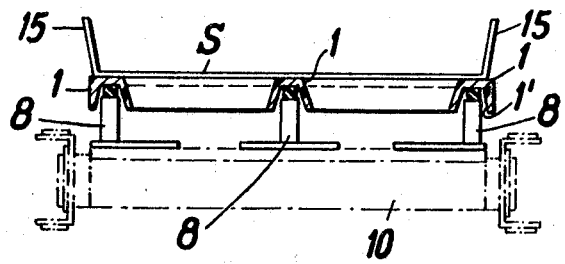
Figure 10:
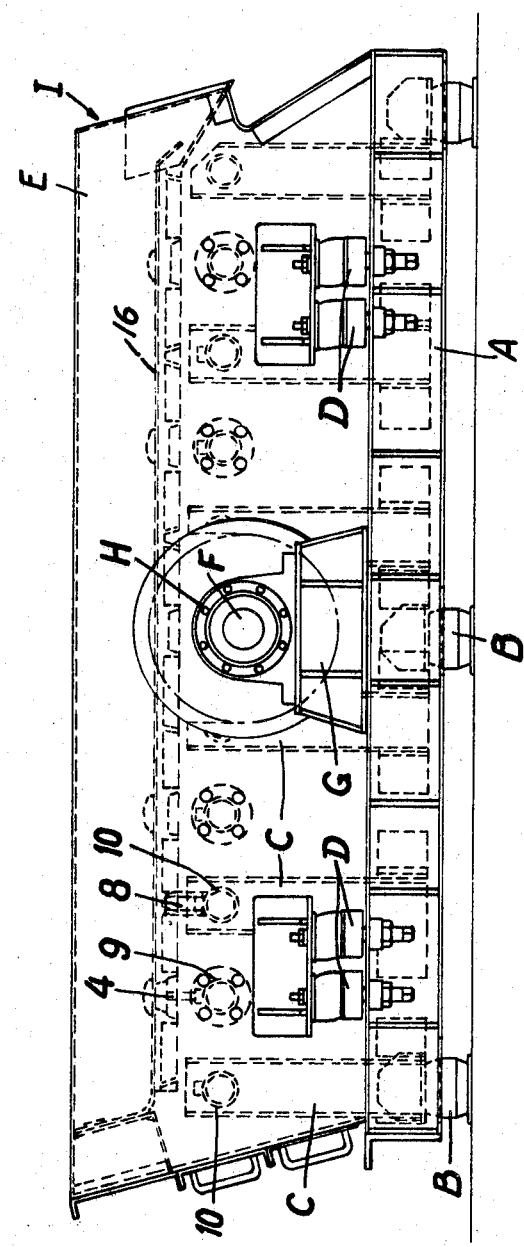
Figure 11:
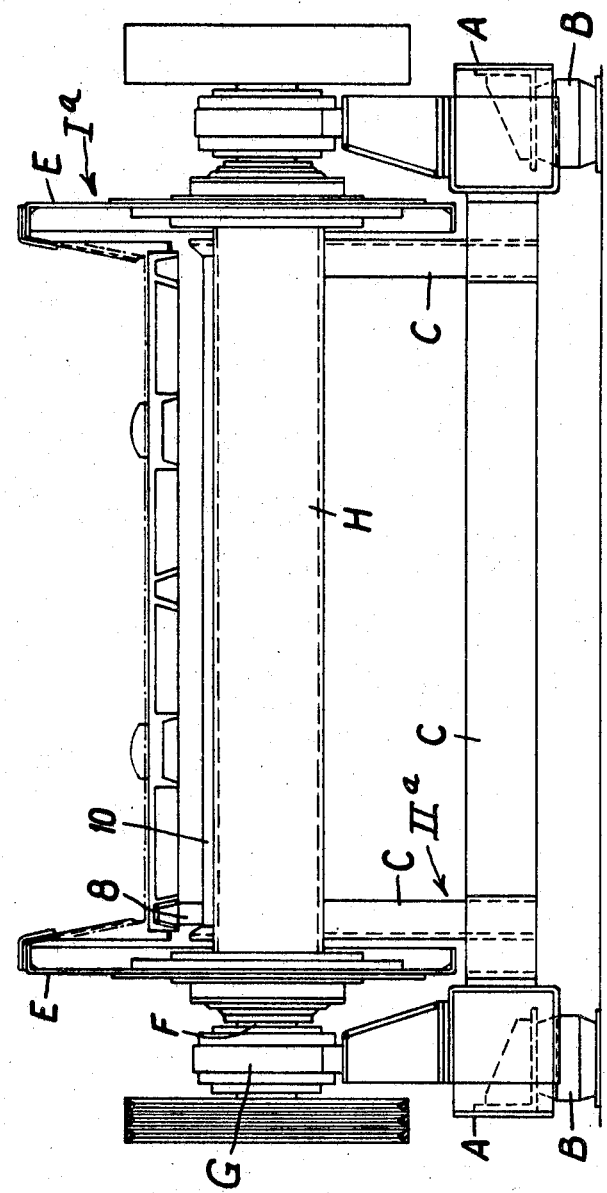

FIGURES 8 and 9 are sections taken on the line 8—8 and 9—9, respectively, of FIGURE 6;

FIGURE 10 is a front elevation of a machine for imparting the desired motion to the bearer member groups; and FIGURE 11 is a transverse sectional view on the line 11—11 of FIGURE 10.

The frame S of the impulse shaking screen shown in the drawings has a grid-like structure. It consists of an elastically resilient material such as cast, molded or welded plastics, preferably of "Vulkollan," "Supralen" or an expanded polyester urethane. The grid of the shaking screen frame is formed by longitudinal and transverse members 1 and 2, respectively, of substantially U-section with their open sides facing downwards, as shown in greater detail in FIGURES 2 to 5. The longitudinal and transverse members therefore have correspondingly shaped grooves 1' and 2', respectively, on their undersides. The frame may be of integral construction or alternatively it may consist of several individual component frames. In the latter case the members at the edges of the individual component frames may conveniently have the cross-sectional shape illustrated in FIGURE 3, two corresponding edge members being suitably connected together. At some of the intersections of the longitudinal and transverse members 1 and 2 the screen frame is provided with holes or openings 3 which, in a manner that will be described hereinafter, serve for mounting the frame on the impulsing pins 4 which belong to one bearer member group I, and which are shown at the left hand side in FIGURE 7. The upper faces of the longitudinal members 1 are formed with trough-like grooves 5 which serve for the insertion of filler sections (not shown) for affixing and stretching the screen cloth 16 with which the frame is to be covered. Holes 6 serve for the reception of the fastenings for the filler sections that are to be inserted into the grooves 5. The screen cloth may be of one piece construction and extend over the entire surface of the screen frame. Alternatively it is quite possible, and may be an advantage in some applications, to insert the screen cloth or mesh into the individual relatively large-sized windows formed by the intersecting longitudinal and transverse members of the frame and to secure it in a suitable manner. Moreover, shallow screen trays (not shown) may be inserted into these windows, said trays containing rapper balls for rapping and cleaning the screen mesh or cloth above. The subdivision of the screening surface into panels of the above described kind, has the advantage that individual panels can be more easily replaced and that the screening surface as a whole is less liable to break, particularly since the elastically resilient impulse shaking screen frame possesses adequate flexibility. By their shed-like conformation the substantially U-shaped downwardly open longitudinal and transverse members 1 and 2 provide a useful cover protecting the movable connections and bearing surfaces of the screen frame S on the impulsing pins 4 of the bearer member group I and upon the supporting pins 8 of the second bearer member group II.

The advantageous method of mounting and supporting the impulse shaking screen frame S on the impulsing pins 4 and on the supporting pins 8 is illustratively shown in FIGURES 6 to 9. More particularly, FIGURE 7 shows that the two groups I and II comprise supporting bearer members 9 and 10, respectively, extending along the length of the screen, said members being located at intervals in a common horizontal frame and being adapted to perform oscillatory motions in the plane of the paper. These motions may be codirectional or counter-directional but in the latter case they are relatively displaced in phase, a phase difference of 180° being then preferred. Alternatively only the impulsing bearer members 9 may perform oscillatory motions whereas the supporting bearer members 10 remain stationary.

The bearer members 10 carry supporting pins 8 which longitudinally slidably project into the grooves 1' of the longitudinal members 1 of the screen frame. The screen frame therefore merely rests loosely on the supporting pins 8 and is in actual contact therewith only during one half cycle of each oscillation. On the other hand, the impulsing pins 4 on the bearer members 9 are guided in mushroom-shaped or cup-shaped bushings 11 in which they have limited vertical freedom of movement. The bushings 11 are flush with the upper surface 12 of the screen frame and they are secured in the holes 3 of the screen frame S by means of a threaded sleeve 13. The impulsing pins 4 and the guiding bores 11' in bushings 11 are additionally covered by bell-shaped protective caps 14 retained by the threaded sleeves 13 in the manner illustrated at the left-hand side in FIGURE 7 on the underside of the screen frame S. FIGURES 8 and 9 show that ledges 15 for laterally containing the screened material are secured to the outside longitudinal members 1 of the screen frame S.

If it is assumed that the bearer members 9 and 10 of the two groups I and II and hence the impulsing and supporting pins 4 and 8 perform circular oscillatory motions that are 180° out of phase, then the impulsing pins 4 of group I will impart to the screen frame S a corresponding semi-circular oscillation during the upper half cycle of the oscillation of the impulsing pins 4. On the other hand, during the lower half cycle of the oscillation of the impulsing pin 4 the screen frame S merely descends on the pins to be received during this half cycle by the supporting pins 8 as the latter rise to perform the upper half cycle of their oscillation, and to be carried upwards through the same semi-circle as before. The result is a semi-circular oscillatory motion with sharp reversal points. If the bearer members 10 are stationary, then an ordinary impulsed semi-circular oscillatory motion will result. The impulse shaking frame S therefore forms a vibrating base upon which all kinds of screen cloths or meshes can be very easily mounted either in stretched, wave-shaped or cascade-like form. In order to reduce the sliding friction during the return motion of the frame generated between the latter and the supporting pins 8, suitable friction reducing linings may be provided on the latter and, if desired, the supporting pins 8 may have the form of rolling balls, roughly resembling ball catches.

In order to achieve the motions above mentioned with respect to the bearer member groups or swing frames Ia and IIa attention is directed to FIGURES 10 and 11 showing suitable mechanism for same. As shown, the main frame A is supported on rubber cushions B and has vertical carrier supports C. Between each facing pair of supports C is a carrier 10. Engaging the top side of each carrier are the pins 8. The above members cooperate to form the swing frame IIa of the group II.

Also mounted on the main frame A and supported on rubber cushions D is the primary swing frame Ia. It has side plates E between which are supported carriers 9 on which are the pins 4. An eccentric shaft F is mounted at opposite ends in bearings G on the main frame A. A protective pipe H encloses the eccentric shaft F and is arranged at the top of the carriers 10 and 9. It is also provided with pins 4 similar to the carriers 9 but not illustrated.

The sieve frame lies in each half phase of oscillation alternately on the pins 4 of the primary swing frame Ia and the pins 8 of the secondary swing frame. In this way there takes place the oscillating motions of the sieve frame. During the traveling through the forward curve from 0° to 180°, the sieve frame rests only on the pins 4 and accordingly is caught or moved by these. The sieve frame lies during the backward motion from 180° to 0° only on the pins 8, whereby its horizontal motion afterwards as before is effected through the pins 4 which partly travel out of the driving heads 13. The above oscillation of the sieve frame is supplemented by a comparatively slight motion due to the resilient mounting of the main frame A.

What I claim is:

1. A vibratory screen of the character described comprising an elastic screen frame having a plurality of symmetrically spaced intersecting longitudinal and transverse members of inverted U-form in cross section, a screen cloth adapted to be inserted in the spaces formed by said intersecting members, a row of holes at the intersections of certain of said members, depending cup-shaped bushings secured in said holes respectively, impulsing pins having limited vertical sliding movement in said bushings respectively, bearer members carrying said pins respectively for imparting oscillatory movement thereto, a row of supporting pins alternating with said impulsing pins and projecting engagingly into the grooves formed by said inverted U-form of said screen frame, and bearer members for said supporting pins respectively.

2. A screen as claimed in claim 1, in which said bearer members for said supporting pins have oscillatory movement 180° out of phase with respect to said bearer members for said impulsing pins.

References Cited

UNITED STATES PATENTS

| | | | |
|---|---|---|---|
| 944,073 | 12/1909 | Callaway | 209—405 X |
| 1,114,064 | 10/1914 | Sturtevant | 209—403 X |
| 2,032,082 | 2/1936 | Deister | 209—382 |
| 2,165,946 | 7/1939 | Smith | 209—381 X |
| 2,335,084 | 11/1943 | Rice | 209—403 X |
| 2,519,162 | 8/1950 | Tucker. | |
| 2,975,900 | 3/1961 | Hoffman | 209—403 |
| 3,261,469 | 7/1966 | Wehner | 209—325 |

FOREIGN PATENTS

| | | |
|---|---|---|
| 743,902 | 1/1956 | Great Britain. |

HARRY B. THORNTON, *Primary Examiner.*

R. HALPER, *Assistant Examiner.*